2,947,659
STABILIZED BORDEAUX MIXTURE COMPOSITION

Charles H. Rogers, Norwalk, Conn., assignor to R. T. Vanderbilt Company, Inc., New York, N.Y., a corporation of New York No Drawing. Filed Mar. 5, 1956, Ser. No. 569,302

7 Claims. (Cl. 167—16)

This invention relates to suspensions of insoluble finely divided solids in fluids and to an additive adapted to improve the properties of such suspensions.

Suspensions of finely divided material in fluid media are commonly used as insecticides, fungicides, etc. Desirable qualities in such suspensions include adherence to the foliage or fruit, spreading over the surface of the foliage or fruit, and the ability of the solid material to remain in suspension and not settle out. Adherence to foliage or fruit in areas where rainfall is heavy must be good, or more frequent spraying is required to give continuing protection against disease organisms. If spreading characteristics can be improved, better coverage of foliage or fruit results, with greater protection of the plant, and it may be possible to reduce the amount of spray adequate for treatment. A thinner film thereby will often afford just as much protection against micro-organisms as a heavier one of an ordinary type. If the sediment tends to settle, particularly if it settles into a dense layer at the bottom of the vessel, it may be very difficult, if not impossible, to resuspend the solid for spraying. Good resuspendability of the insecticide or fungicide would allow larger quantities of spray to be prepared at one time and used over a period of several days. Present practice is to make fresh batches of insecticide or fungicide mixture daily, discarding whatever remains at the end of the day since it does not resuspend readily the following day.

The concept of my invention encompasses an additive which imparts these desirable characteristics to suspensions of insoluble finely divided solids in aqueous media such as pesticide, e.g., insecticide and fungicide spray mixtures. The additive is basically a mixture of two ingredients, the first of which is the calcium salt (or other alkaline earth metal salt) or the sodium salt (or other alkali metal salt) of lignosulfonic acid (for example, calcium lignosulfonate or sodium lignosulfonate). The second ingredient of my additive may be described as the chemical equivalent of an esterified mixture of 1 to 6 moles of an aliphatic monocarboxylic acid containing from 8 to 18 carbon atoms, or mixtures of such acids, and one mole of a polyhydric alcohol containing 3 to 9 carbon atoms (preferably 3 to 6 carbon atoms in the polyhydric alcohol residue). The mixture preferably contains a certain amount of unesterified acid and alcohol and a certain amount of a wetting agent, as will appear hereinafter. The additive is prepared by blending intimately the lignosulfonate and the acid-alcohol mixture described in a weight ratio of between 15 to 25 parts of the lignosulfonate and 0.75 to 1.5 parts of the acid-alcohol mixture (as measured by the weight equivalent to that at complete esterification). In using the additive in preparing improved suspensions according to the invention, the additive is simply admixed with the other ingredient or ingredients of the suspension to the extent of 1 to 3% by weight based on the solids content in the suspension. The suspension formed possesses unexpectedly improved qualities from the standpoint of adherence, spreading power, and resuspension characteristics previously described. The polyhydric alcohols which may be used in the compositions include glycerol as an example of a 3 carbon atom trihydric alcohol, pentaerythritol as an example of a 5 carbon atom tetrahydric alcohol, sorbitan as an example of a 6 carbon atom tetrahydric alcohol, sorbitol as an example of a 6 carbon atom hexahydric alcohol, and the alkyl glycosides containing 1 to 3 carbon atoms in the alkyl group as examples of tetrahydric alcohols containing 7 to 9 carbon atoms, with 6 carbon atoms in the polyhydric alcohol residue. Among the alkyl glycosides which may be used there is included methyl alpha-D-glucoside. However, there can be substituted other alkyl glucosides such as methyl beta-D-glucoside, as well as ethyl alpha-D-glucoside, ethyl beta-D-glucoside or the corresponding alkyl glucosides wherein the alkyl groups are propyl, that is, alkyl glucosides in which the alkyl group has 1 to 3 carbon atoms.

The monocarboxylic acids which may be employed within the scope of the invention include coconut fatty acids. However, others are satisfactory, for example, caprylic acid, capric acid, lauric acid, myristic acid, palmitic acid, stearic acid, oleic acid, and linoleic acid, as well as mixtures containing those acids derived in known manner from the naturally occurring fats and oils, such as palm oil, peanut oil, cottonseed oil, soya bean oil, grape seed oil, linseed oil, olive oil, and the like.

In preparing suitable acid-polyhydric alcohol mixtures the monocarboxylic acid and the alcohol are admixed by heating them with each other under esterifying conditions suitable at a temperature within the range 100 to 200° C. in an aqueous medium, or in an anhydrous aromatic or aliphatic solvent and in the presence of a catalyst. The water formed by esterification is removed, as well as any water present in the system, and the heating is continued for a sufficient period of time to produce the degree of esterification desired. The heating may, for for example, be continued until substantially all of the water has been removed from the reaction mixture so as to esterify substantially all of the esterifiable hydroxyl groups of the polyhydric alcohol, or all of the fatty acid, in case there is an excess of alcohol present. However, according to a particular embodiment of the invention, esterification reactions between the carboxylic acid and the alcohol is arrested when the amount of free (unesterified) acid is at least 40 mol percent of the total equivalent fatty acid present, and the amount of free (unesterified) alcohol is at least 40 mol percent of the total equivalent alcohol present. However, the amount of free acid (unesterified) should be no more than 75 mol percent, and the amount of free (unesterified) alcohol no more than 75 mol percent of the total amount of acid and alcohol present, respectively.

Within the concept of the invention according to which the acid-alcohol mixture contains partly esterified material and partly free acid and free alcohol, it is not necessary that the mixture be prepared by limiting the degree of the esterification of the original mixture. If desired, the esterification may be carried out to a more advanced degree or even to completion and the unesterified free acid and alcohol may be added to the mixture subsequently.

The catalysts which are useful in esterifying the alcohol with the monocarboxylic acid include, for example, calcium oxide, litharge, sodium hydroxide, potassium hydroxide, calcium naphthenate or lithium naphthenate.

Among the fungicide compositions which are particularly adaptable to the present invention is included Bordeaux mixture which is one of the most widely used and accepted fungicides for agricultural purposes. Many formulas have been suggested for Bordeaux mixture, and it has been accepted that the proportions of lime and copper sulfate may be varied somewhat according to the purpose for which the material is to be used. In this country, however, the formula generally calls for the use of hydrated lime in weight amount approximately equal to the weight of the copper sulfate used. A 4–4–50 Bordeaux mixture, for example, consists of four pounds of copper sulfate and four pounds of hydrated lime made up to 50 gallons of spray suspension with water. Bordeaux mixture, when properly made, consists of a light blue gelatinous precipitate suspended in water. Under certain climatic conditions, as in warmer climates, improvements in some of the properties of Bordeaux mixture would be a distinct advantage. These improvements are supplied according to the invention by improving adherence, spreading and resuspendability characteristics. The composition of the invention may advantageously be applied to other finely divided suspensions of copper compounds in aqueous vehicles, including pesticides such as insecticides and fungicides, e.g., fixed or insoluble copper fungicides such as basic copper sulfate, tribasic copper sulfate, cuprous oxide, copper oxychloride, copper oxychloride sulfate, tetra copper calcium oxychloride, basic copper carbonate and ammoniacal copper complexes; inorganic insecticides such as lead arsenate; organic insecticides such as DDT and benzene hexachloride; inorganic fungicides such as wettable sulfur and lime sulfur; organic pesticides such as "Captan," "Ferbam" (ferric dimethyl dithiocarbamate) (fungicide), "Nabam" (disodium ethylene bisdithiocarbamate) (pesticide), "Thiram" (tetramethylthiuram disulfide) (insecticide), "Ziram" (zinc dimethyl dithiocarbamate) (pesticide), "Maneb" (manganous ethylene bisdithiocarbamate), "Zineb" (zinc ethylene bis-dithiocarbamate) (fungicides), and organo-mercurials.

The problem of settling and the desirable attributes of prolonged resuspendability of finely divided material in a fluid apply also to pigments in water-base paints. Accordingly, the invention is also applicable to paints, and the additives of the invention may be added to pigments in the amounts stated to improve these properties.

In preparing suspensions according to the invention, wetting agents may be added thereto in order to enhance the wetting and spreading characteristics of the suspension. Most suitably, such wetting agent is added to the lignosulfonate, acid-alcohol mixture before the latter is suspended in fluid. Preferred wetting agents are the low-foaming non-ionic detergents of the alkyl aryl polyether alcohol type. The amount of detergent is approximately 0.3 to 9.0 parts by weight, based on the composition previously described for a lignosulfonate and acid-alcohol mixture.

Following are examples of the method and product of the invention.

EXAMPLE 1

As an illustration of the preparation of an additive and a Bordeaux mixture falling within the scope of my invention, 84.27 grams of coconut fatty acids and a trace of calcium oxide catalyst were added to a mixture of 19.4 grams of methyl alpha-D-glucoside in 100 ml. of water. The mixture was boiled for 3½ hours at atmospheric pressure until substantially all of the water was removed, the mixture then being practically anhydrous. During the boiling, the temperature gradually rose to about 160° C. Following this, the mixture was permitted to cool to room temperature, at which time it was in the form of a solid, wax-like composition. It was determined by analysis that 70% of the glucoside was present in the product as unesterified glucoside, and the remainder was esterified with the fatty acids, mainly as the di-ester. 53% of the fatty acid was free (unesterified) and the remainder was present in the form of the ester. 0.24 ounces of the reaction product, in admixture with 4.76 ounces of calcium lignosulfonate, was then added with stirring to a standard 10:10:100 Bordeaux mixture (ten pounds of copper sulfate and ten pounds of hydrated lime in 100 gallons of water) in the amount of 5 ounces of additive per 20 pounds of Bordeaux solids, as those solids have been previously defined.

When the Bordeaux mixture was supplemented with the additive as described, it resuspended as well after standing nine days as it did when freshly made. This could be measured by a setting test by which 100 ml. of Bordeaux mixture in a graduated cylinder is considered satisfactory if no more than about 25% of the solids settle within three hours after suspending by shaking. Bordeaux mixture freshly made will give a reading of about 12% on the average, but after standing for 24 hours or more it will usually settle out in excess of 15% within 12 to 30 minutes, and around 60% in three hours. With the inclusion of my additive, the mixture continued to pass the 15% requirement after aging for as long as nine days, giving an average reading of about 10% settling three hours after resuspension.

Adherence to leaf surfaces is difficult to measure accurately, but can be observed visually as can the spreading properties of the spray mixture. In the laboratory it was found that clean miscroscope slides could be used to measure the differences between the standard Bordeaux mixture and the same mixture containing the additive. Slides were sprayed using a DeVilbiss atomizer to run-off, that being the point when the first droplet of spray reached the bottom of the slides. The slides were placed at a 45° angle with the horizontal prior to spraying. Replicate slides were prepared, a minimum of three for any one trial. The slides were then dried at room temperature and were placed in an oven at 105° C. and dried to constant weight. The slides were then placed at a 90° angle with the horizontal and washed by overhead water spraying for 30 minutes, the temperature of the water being 24° C. Following this, the slides were air dried and oven dried as before to constant weight. The original weight of dried Bordeaux film gives an indication of spread; the final weight compared to the original gives the percent retention or adherence.

Standard Bordeaux mixture by such an evaluation gives a retention of approximately 42%. By including my additive, the original deposit is reduced by about 10% and the retention is improved by from about 20 to 75%, with an average of about 50% increased deposit remaining after the washing.

EXAMPLE 2

As an illustration of the preparation of an additive for an improved fixed copper fungicide falling within the scope of my invention, 3775 grams of palmitic acid, 590 grams methyl alpha-D-glucoside and 4.7 grams litharge catalyst were placed in the reactor and melted at 60° C. Then 325 cc. benzol was added, the reactor was closed, and heated to 170° C. with stirring. Refluxing was continued and water of reaction was collected (109 cc.) until reaction was completed (5 to 6 hours), i.e., until there was no unesterified acid nor alcohol left. The lead was removed from the product by precipitation with adipic acid, and filtration. The diester was allowed to cool to 80 to 90° C. and was removed from the reactor, solidified, and broken into small pieces. The benzol was allowed to evaporate. The following ingredients were then blended to make the complete additive: calcium lignosulfonate 185 grams, palmitic acid diester plus palmitic acid excess 8.1 grams (4.0 grams diester, 4.1 grams palmitic acid), methyl alpha-D-glucoside 1.5 grams, alkyl aryl polyether alcohol (wetting agent) 5.0 grams. The amount of product obtainable from the acid-glycoside mixture at complete esterification would be 9.3 grams. The percentages of the total equivalent acid, and of the total equivalent alcohol present that were not esterified were each 57 mol percent.

The fixed copper fungicide used was a commercial preparation containing 36.1% copper hydroxysulfate (metallic copper given as 13%). To 100 grams of this compound was added 0.722 gram of my additive (2% on the weight of copper hydroxysulfate) and the two intimately blended. The fixed copper fungicide suspension containing my additive was compared with a similar suspension containing no additive. Without my additive, a fresh suspension of 2.4 grams in 100 ml. total volume with water was 92% settled in 5 minutes (92 ml. clear supernatant liquid in a 100 ml. graduated cylinder) and 93.5% in 15 minutes. The total volume of precipitate was 6.5 ml. With my additive, the suspension showed no settling in 15 minutes and only 0.5% in 3 hours, at which time it had a total precipitate volume of 3 ml. Adherence tests were run on *Musa balbisiana* foliage. The same spray suspensions detailed above were applied, when freshly made, by a DeVilbiss atomizer to sections of the same leaf of this plant. Deposits were allowed to dry overnight, then samples removed for chemical analysis. Leaf sections were then subjected to 4 inches of simulated rainfall from a spray head, the water being at 24° C. The leaf was at a 45° angle with the horizontal. These samples were then allowed to dry overnight before analyses were run.

The analytical method used was as follows. The copper was removed from the leaf by aqueous HCl solution and rinsing. The copper salt of diethyldithiocarbamic acid was formed and the color intensity was measured by a photoelectric colorimeter and compared to established color standards. The copper was calculated as micrograms per square centimeter of leaf surface.

Analytical results before and after rainfall tests showed:

| Protectant | Original, mcg. Cu/cm.$^2$ | After 4″ rainfall, mcg. Cu/cm.$^2$ | Retained (Percent) |
| --- | --- | --- | --- |
| Copper hydroxysulfate | 12.60 | 3.05 | 24.2 |
| Copper hydroxysulfate+additive | 14.85 | 7.70 | 51.8 | or an improvement of 114% in retention with the additive. The superior spreading is easily visible to the naked eye, leaving a much more even deposit with than without the additive, and giving complete coverage of the leaf area compared to incomplete coverage (many bare spots) for the control test.

EXAMPLE 3

The procedure described in Example 2 was repeated except that the copper hydroxysulfate was replaced with basic copper sulfate (dust) and the calcium lignosulfonate was replaced with sodium lignosulfonate. The ester, alcohol and acid, and the amount thereof, were the same as in Example 2. Adherence tests carried out as described in Example 2 showed that the composition containing the additive of the present invention had 69% better retention than the same material containing no additive.

EXAMPLE 4

The procedure described in Example 3 was repeated except that the basic copper sulfate was replaced with copper oxychloride sulfate. Adherence tests carried out as described in Example 2 showed that the composition containing the additive of the present invention had 112% better retention than the same material containing no additive.

EXAMPLE 5

The procedure described in Example 3 was repeated except that the basic copper sulfate was replaced with DDT. Adherence tests carried out as described in Example 2 showed that the composition containing the additive of the present invention had 69% better retention than the same material containing no additive.

EXAMPLE 6

The procedure described in Example 3 was repeated except that the basic copper sulfate was replaced with tetra copper calcium oxychloride. Adherence tests carried out as described in Example 2 showed that the composition containing the additive of the present invention had 36% better retention than the same material containing no additive.

EXAMPLE 7

The procedure described in Example 2 was repeated except that the copper hydroxysulfate was replaced with lead arsenate. Adherence tests carried out as described in Example 2 showed that the composition containing the additive of the present invention had 111% better retention than the same material containing no additive.

EXAMPLE 8

The procedure described in Example 7 was repeated except that the lead arsenate was replaced with zinc ethylene bis-dithiocarbamate. Adherence tests carried out as described in Example 2 showed that the composition containing the additive of the present invention had 54% better retention than the same material containing no additive.

EXAMPLE 9

The procedure described in Example 2 for the preparation of palmitate esters was repeated starting with 124 grams of pentaerythritol, 467 grams of palmitic acid, 0.7 gram of litharge catalyst and 48 grams of benzene. The reaction was carried to substantial completion. 571 grams of free palmitic acid and 216 grams of free pentaerythritol were mixed with the ester produced to form a mixture having 57 mol percent of the total equivalent acid, and the same percentage of total equivalent alcohol unesterified. 9.3 grams of the mixture were added to 185 grams of calcium lignosulfonate and 72 grams of an alkyl aryl polyether alcohol nonionic wetting agent was also added. The mixture produced was incorporated in 5-3.75-50 Bordeaux mixture in the amount of 2.66% by weight based on the Bordeaux solids. Settling rate tests were carried out by the standard procedure described in Example 1, after the Bordeaux mixture was 24 hours old, with the results summarized in Table 1. The numbers given are the percentages of clear supernatant liquid appearing after the time interval. The control was Bordeaux mixture with no additive.

Tests for the retention of the spray on leaf surfaces were carried out by spraying various compositions on adjacent blocked-off sections of the No. 1 leaf of a *Musa paradisiaca* var. *sapientum* plant. The appearance of all sprays with additive was satisfactory, but the Bordeaux control gave poor spread. The leaf sections were subjected to 4 inches of simulated rainfall and analyses were made for copper by the standard method. Leaf samples were allowed to dry over night before analysis. The results are presented in Table 2. The high deposit for the control was due to local heavy deposit areas, but the spread was poor.

EXAMPLE 10

The procedure described in Example 9 was duplicated simultaneously using glycerol as the polyhydric alcohol instead of pentaerythritol, keeping the mol percent free acid and free alcohol and the relative weight quantities of equivalent ester, lignosulfonate, wetting agent and Bordeaux solids, the same as they were in Example 9. The resuspension data after 24 hours are presented in Table 1, and the leaf deposit and retention data in Table 2.

EXAMPLE 11

The procedure described in Examples 9 and 10 was duplicated simultaneously using methyl a-D glucoside as the polyhydric alcohol instead of pentaerythritol or glycerol. The resuspension data after 24 hours are presented in Table 1, and the leaf deposit and retention date in Table 2.

Table 1

[Resuspension after 24-hr. aging.]

| Additive | Time | | | | | | |
|---|---|---|---|---|---|---|---|
| | 15' | 30' | 45' | 1 hr. | 1.5 hr. | 2 hr. | 3 hr. |
| None (control) | 3 | 5 | 6 | 8 | 10 | 20 | 25 |
| Example 9 | 1 | 2 | 3 | 5 | 6 | 12 | 16 |
| Example 10 | 2 | 3 | 4 | 5 | 6 | 13 | 18 |
| Example 11 | 1 | 2 | 3 | 4 | 5 | 10 | 17 |

Table 2

[Micrograms Cu/sq. in. leaf surface.]

| Additive | Initial Deposit | After Rainfall | Percent Retained |
|---|---|---|---|
| None—Bordeaux control | 243.0 | 33.0 | 13.5 |
| Example 9 | 51.6 | 47.0 | 91.0 |
| Example 10 | 41.9 | 40.0 | 95.5 |
| Example 11 | 47.0 | 51.6 | 100.0 |

Although certain specific features of the invention have been described herein, the invention is not limited thereto, and it is intended to include within the appended claims all modifications and equivalents within the spirit and scope of the invention.

This application is a continuation-in-part of my copending application Serial Number 494,283, filed March 14, 1955, now abandoned.

I claim:

1. Bordeaux mixture containing, in an amount from 1 to 3% by weight of the solids content of the Bordeaux mixture, a lignosulfonate and the product formed by the reaction of 1 to 6 moles of an aliphatic hydrocarbon monocarboxylic acid containing from 8 to 18 carbon atoms, and 1 mole of a polyhydric alcohol containing 3 to 9 carbon atoms and 3 to 6 hydroxyl groups, the amount of unesterified acid being zero to about 75 mol percent of the total equivalent acid, and the amount of unesterified alcohol being zero to about 75 mol percent of the total equivalent alcohol, the relative proportions of lignosulfonate being within the range from 15 to 25 parts by weight of lignosulfonate to 0.75 to 1.5 parts by weight of the equivalent amount of product obtainable from said acid and alcohol at complete esterification.

2. A Bordeaux mixture as claimed in claim 1 in which at least 40 mol percent of each of the equivalent acid and equivalent alcohol is unesterified.

3. A Bordeaux mixture according to claim 1 wherein the alcohol is an alkyl glycoside containing from 1 to 3 carbon atoms in each alkyl radical.

4. A Bordeaux mixture according to claim 1 in which the lignosulfonate is calcium lignosulfonate.

5. A Bordeaux mixture containing, in an amount from 1 to 3% by weight of the solids content of the Bordeaux mixture, calcium lignosulfonate and a reaction product prepared by heating from 1 to 6 mols of an aliphatic hydrocarbon monocarboxylic acid containing from 8 to 18 carbon atoms and 1 mol of an alkyl glycoside containing from 1 to 3 carbon atoms in each alkyl radical at a temperature within the range from about 100 to 200° C. until the reaction mixture is substantially anhydrous, the relative proportions of calcium lignosulfonate being within the range from 15 to 25 parts by weight of sulfonate to 0.75 to 1.5 parts by weight of said reaction product.

6. A Bordeaux mixture according to claim 5, wherein the alkyl glycoside is methyl alpha-D-glucoside.

7. A Bordeaux mixture according to claim 5 wherein said monocarboxylic acid is coconut fatty acids.

References Cited in the file of this patent

UNITED STATES PATENTS

| 1,958,624 | Howard et al. | May 15, 1934 |
| 2,172,314 | Adams | Sept. 5, 1939 |
| 2,337,466 | Herbert | Dec. 21, 1943 |
| 2,369,429 | Boissonou | Feb. 13, 1945 |
| 2,530,770 | Hopperstead | Nov. 21, 1950 |

OTHER REFERENCES

Schwartz et al.: "Surface Active Agents," 1949, Intersci. Pub. Inc., N.Y., pp. 121, 495, 496 and 509.

Brown et al.: Soap (July 1951), pp. 43, 45, 47 and 49.